(12) United States Patent
Fujii et al.

(10) Patent No.: US 12,241,593 B2
(45) Date of Patent: Mar. 4, 2025

(54) METHOD FOR ASSEMBLING GAS FILLING DEVICE

(71) Applicant: Tatsuno Corporation, Tokyo (JP)

(72) Inventors: Rena Fujii, Tokyo (JP); Ko Saito, Tokyo (JP); Katsumi Nagai, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 18/505,910

(22) Filed: Nov. 9, 2023

(65) Prior Publication Data

US 2024/0167637 A1    May 23, 2024

(30) Foreign Application Priority Data

Nov. 18, 2022  (JP) ................... 2022-184634

(51) Int. Cl.
| | |
|---|---|
| *F17C 13/08* | (2006.01) |
| *B23P 11/00* | (2006.01) |
| *B60S 5/02* | (2006.01) |
| *B67D 7/84* | (2010.01) |

(52) U.S. Cl.
CPC .............. *F17C 13/08* (2013.01); *B23P 11/00* (2013.01); *B60S 5/02* (2013.01); *B67D 7/84* (2013.01); *F17C 2205/0107* (2013.01); *F17C 2209/22* (2013.01); *F17C 2209/228* (2013.01); *F17C 2221/012* (2013.01); *F17C 2227/03* (2013.01); *F17C 2265/065* (2013.01); *Y10T 29/49904* (2015.01); *Y10T 29/49963* (2015.01)

(58) Field of Classification Search
CPC ......... Y10T 29/49904; Y10T 29/49963; F17C 2205/0107; F17C 2209/228; F17C 2265/065; F17C 2209/22; B23P 11/00; B67D 7/84; B60S 5/02
See application file for complete search history.

(56) References Cited

U.S. PATENT DOCUMENTS

| | | | |
|---|---|---|---|
| 9,120,664 B2 * | 9/2015 | Birkler | B67D 7/406 |
| 2009/0113828 A1 * | 5/2009 | Radu, Jr. | E01F 1/00 |
| | | | 52/745.19 |
| 2015/0377417 A1 * | 12/2015 | Rado | F17C 13/04 |
| | | | 141/369 |
| 2020/0332961 A1 * | 10/2020 | Kanamori | F17C 13/084 |
| 2022/0403982 A1 * | 12/2022 | Tilhof | F17C 5/007 |

FOREIGN PATENT DOCUMENTS

JP    2014109350 A    6/2014

* cited by examiner

*Primary Examiner* — Jermie E Cozart
(74) *Attorney, Agent, or Firm* — Stetin Brunda Garred & Brucker

(57) ABSTRACT

To provide a method for assembling a gas filling device in which its assembly work is simplified by unitizing a housing body and the total number of assembly steps is reduced, thereby achieving high production efficiency. A method for assembling a gas filling device 100 according to the present invention including the steps of: installing a base frame 1; placing a lower unit 10 containing a heat exchanger 13 on the installed base frame 1; positioning an intermediate unit 20 including a display above the lower unit 10; arranging side units 40 on both sides of the lower unit 10 and the intermediate unit 20, the side units 40 housing filling hoses having filling nozzles at their tips; and arranging a top unit 30 containing a flow meter 33 above the intermediate unit 20.

6 Claims, 9 Drawing Sheets

METHOD FOR ASSEMBLING GAS FILLING DEVICE

CROSS-REFERENCE TO RELATED APPLICATIONS

The present application claims priority to Japanese Patent Application No. 2022-184634 filed on Nov. 18, 2022, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a method for assembling a gas filling device for filling a vehicle (FCV) or the like with gaseous fuel such as hydrogen gas.

2. Description of the Related Art

Japan lacks fossil fuels and relies on imports from overseas, making it susceptible to international developments. Therefore, in recent years, hydrogen, which can be produced from various resources, has been attracting attention because it is environmentally friendly and useful for energy security. The applicant has also proposed, to address this environmental problem, gas filling devices that stably and efficiently fill gas fuel into on-board tanks installed in vehicles such as fuel cell vehicles and hydrogen vehicles that use hydrogen gas as fuel in the Japanese Patent Publication No. 2014-109350. Although the conventional technology is effective, when assembling a gas filling device, devices such as flowmeters, valves, piping, gas pipe cooling parts, etc. are installed and connected to a frame after an entire frame is assembled.

However, since bolt fastening holes in the frame are loose in position and size, assembly errors may cause distortion of the frame structure. In addition, since the gas pipe cooling unit is the smallest size that can be installed within the frame of a main body housing, and is a heavy device weighing approximately 200 kg, it must be installed within the frame while being moved and made plumbing connections by multiple people. The piping has a primary side piping and a secondary side piping, and it required skill to accurately connect each without damaging metal seals between gas pipes and the cooling section. If the metal seal parts are damaged, hydrogen gas may leak therefrom, potentially causing a disaster such as an explosion.

The content of Japanese Patent Publication No. 2014-109350 is incorporated herein by reference in its entirety.

BRIEF SUMMARY

The present invention has been proposed in view of the above-mentioned problems of the prior art, and the object thereof is to provide a method for assembling a gas filling device in which its assembly work is simplified, thereby achieving high production efficiency.

A method for assembling a gas filling device 100 according to the present invention is characterized by including the steps of: installing a base frame 1; placing a lower unit 10 containing a heat exchanger 13 on the installed base frame 1; positioning an intermediate unit 20 including a display above the lower unit 10; arranging side units 40 on both sides of the lower unit 10 and the intermediate unit 20, the side units 40 housing filling hoses having filling nozzles at their tips; and arranging a top unit 30 containing a flow meter 33 above the intermediate unit 20. Here, the lower unit 10, the intermediate unit 20, the side units 40 and the top unit 30 have equipment necessary for gas filling installed inside them.

In the present invention, a positioning hole LH is preferably provided in each unit, and a pin can be inserted into the positioning hole LH formed at a location where each unit overlaps. The positioning hole LH is preferably configured such that the inserted pin can be removed after each unit or a unit and a device are connected (for example, bolted together). The positioning holes LH can be used to connect units to each other or to devices, or to connect cables (harnesses), etc., by using binding bands, if necessary. Further, in the present invention, it is preferable that the base frame 1 has a notch 1A formed therein.

According to the present invention having the above-described configuration, each device can be arranged in advance for each unit, so that the total number of assembly steps can be reduced. Furthermore, compared to the work of fixing devices within the frame of the gas filling device 100, which is constructed by assembling units together, the work of fixing devices to individual units is easier, and the labor involved in the work is significantly reduced.

In the present invention, each unit is provided with a positioning hole, and if the positioning hole LH formed at an overlapping part of each unit has a function that allows insertion of a pin, for example, installing heavy equipment like the heat exchanger 13 in the unit can be facilitated. Since other equipment that should be connected to the heat exchanger 13 via piping can also be accurately installed using positioning holes, even non-experts can connect the primary and secondary piping accurately without damaging the metal seals between the gas pipe cooling section. As a result, leakage of hydrogen gas due to damage to the metal seals can be prevented, and disasters such as explosions can be suppressed. In addition, before firmly connecting each unit with bolts, inserting a pin into the positioning hole LH and temporarily fastening (temporarily assembling) the units, and then tightening them with bolts, etc. enable to reduce assembly errors and distortion of the frame structure. Then, after the units or the units and the equipment are connected (for example, bolted together), the inserted pins can be removed, which allows, if necessary, a binding band to be inserted to bundle wiring, for example.

In the present invention, if the base frame 1 is provided at the lowest part (foundation part) and the notch 1A is formed in the base frame 1, compared to the case where the base frame is not provided with a notch like in a conventional gas filling device, an operator can insert his/her hand through the notch 1A formed in the base frame 1, or a tool that an operator uses approaches or reaches the location to be worked, which facilitates fastening work for anchor bolts and improves work efficiency.

DETAILED DESCRIPTION

Figure 1:
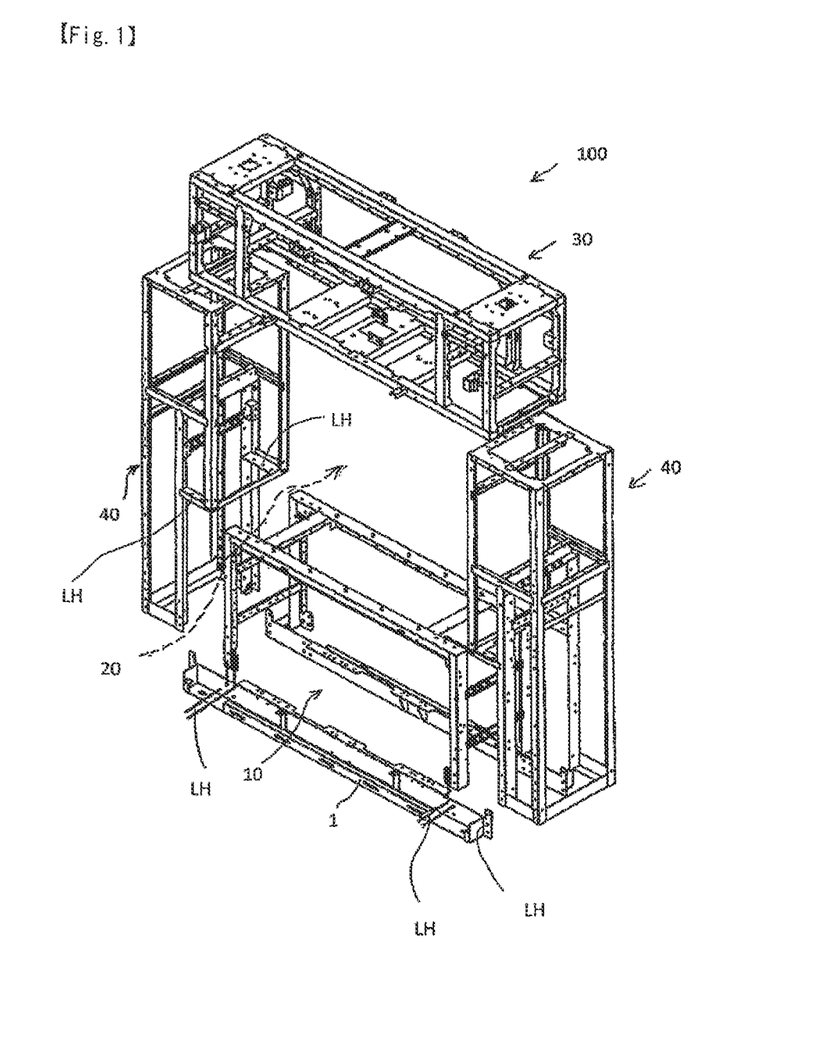
FIG. 1 is an exploded perspective view showing each unit constituting a gas filling device to which a method for assembling a gas filling device according to the present invention is applied.

Hereinafter, an embodiment of the present invention will be described below with reference to the accompanying drawings. In FIG. 1, a gas filling device 100 that is manufactured by a method according to an embodiment of the present invention is composed of a lower unit 10, an intermediate unit 20, a top unit 30, and side units 40 on both sides. Inside each unit, there are devices necessary for filling hydrogen, etc. The intermediate unit 20 is located above the lower unit 10, and the top unit 30 is located above the intermediate unit 20. The side units 40 are located on both sides of the lower unit 10 and the intermediate unit 20, and a base frame 1 is located below the lower unit 10.

Figure 2:
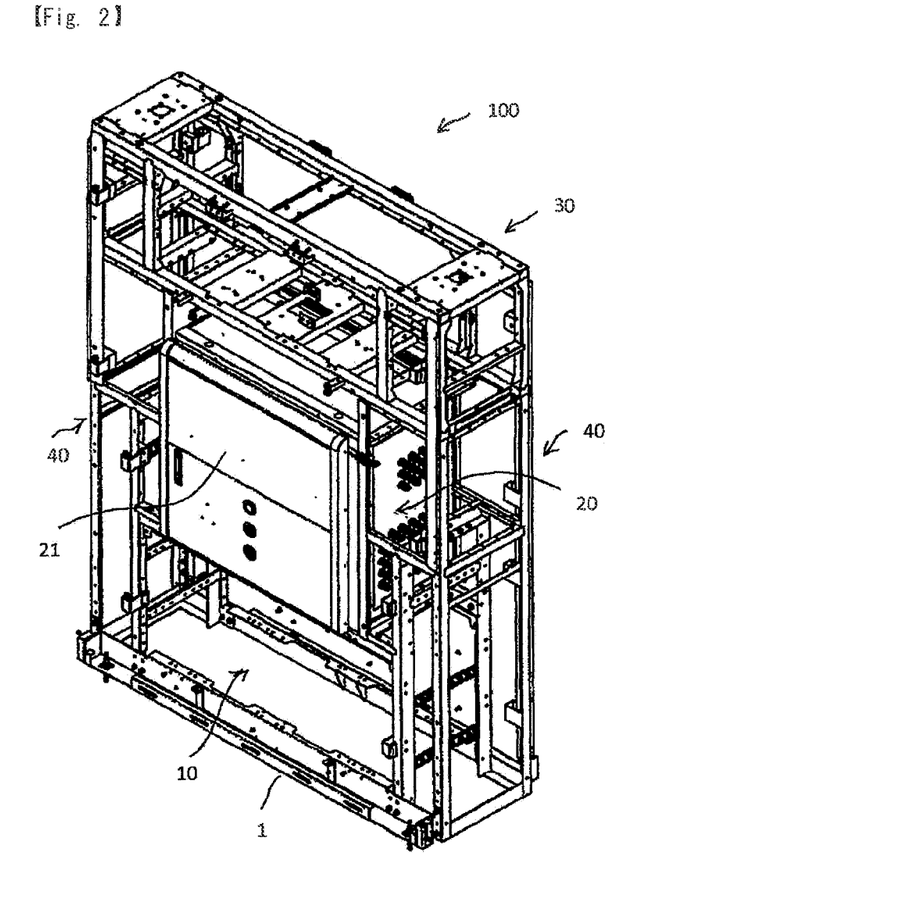
FIG. 2 is a perspective view showing the unit shown in FIG. 1 in an assembled state.

In FIG. 1, illustration of the intermediate unit 20 is omitted, the intermediate unit 20 is mounted in a space between the lower unit 10 and the top unit 30, and is indicated by a broken leader line and a reference numeral 20. In FIG. 1, these units are shown before they are assembled. The assembled state of these units is shown in FIG. 2. In FIG. 2, a display panel 21 is attached to the front surface of the intermediate unit 20. The panels attached to the front of each unit will be described later with reference to FIG. 4.

Figure 3:
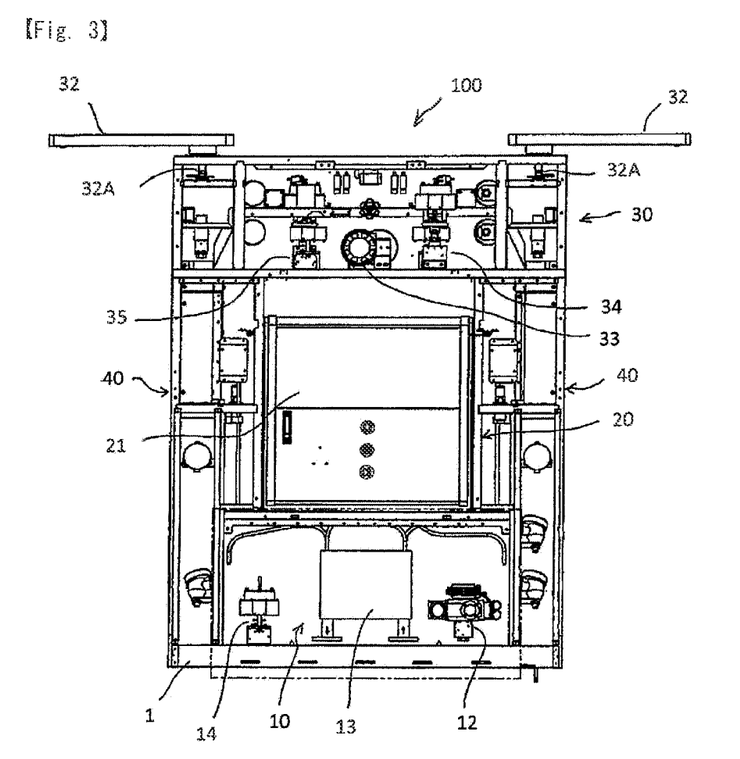
FIG. 3 is a front view showing various devices housed in or attached to each unit.

In FIGS. 1 and 2, in order to simplify illustration, only frames constituting each unit are shown, and various filling devices housed in or attached to each unit are not shown. FIG. 3 shows various filling equipment housed or attached within each unit. The top unit 30 includes, for example: a support arm 32 for suspending and supporting a filling hose (not shown); a support arm rotation mechanism 32A; and a flow meter 33, a cutoff valve 34, an outlet side pressure relief valve 35, piping, etc. forming a hydrogen gas flow path. The side unit 40 is, for example, provided with a filling hose connected to a filling nozzle. The lower unit 10 is provided with, for example, a flow rate adjustment valve 12, a gas pipe cooling section (including a heat exchanger 13, piping, etc.), an inlet side depressurization valve 14, etc., and these devices constitute a hydrogen gas flow passage. The base frame 1 is arranged below the lower unit 10. Regarding the intermediate unit 20, only the display panel 21 attached to the front surface of the intermediate unit 20 is shown in FIG. 3. Although not shown in FIG. 3, a filling amount indicator (counter) and necessary electronic equipment are provided in the intermediate unit 20.

In the illustrated embodiment, each of the units shown in FIGS. 1 and 2 (the lower unit 10, the intermediate unit 20, the top unit 30, the side units 40) is configured as a so-called "subassembly." In the illustrated embodiment, the gas filling device 100 is manufactured by arranging various filling devices at predetermined positions within each unit and attaching them, and then coupling (assembling) the units. Therefore, various equipment necessary for hydrogen filling can be installed in each unit before assembling the units. Compared to the work of arranging and fixing various devices in the assembled gas filling device 100, the work of fixing various devices for hydrogen filling in each individual unit is easier, and work efficiency is improved. Furthermore, the labor required for assembly work is reduced.

Figure 4:
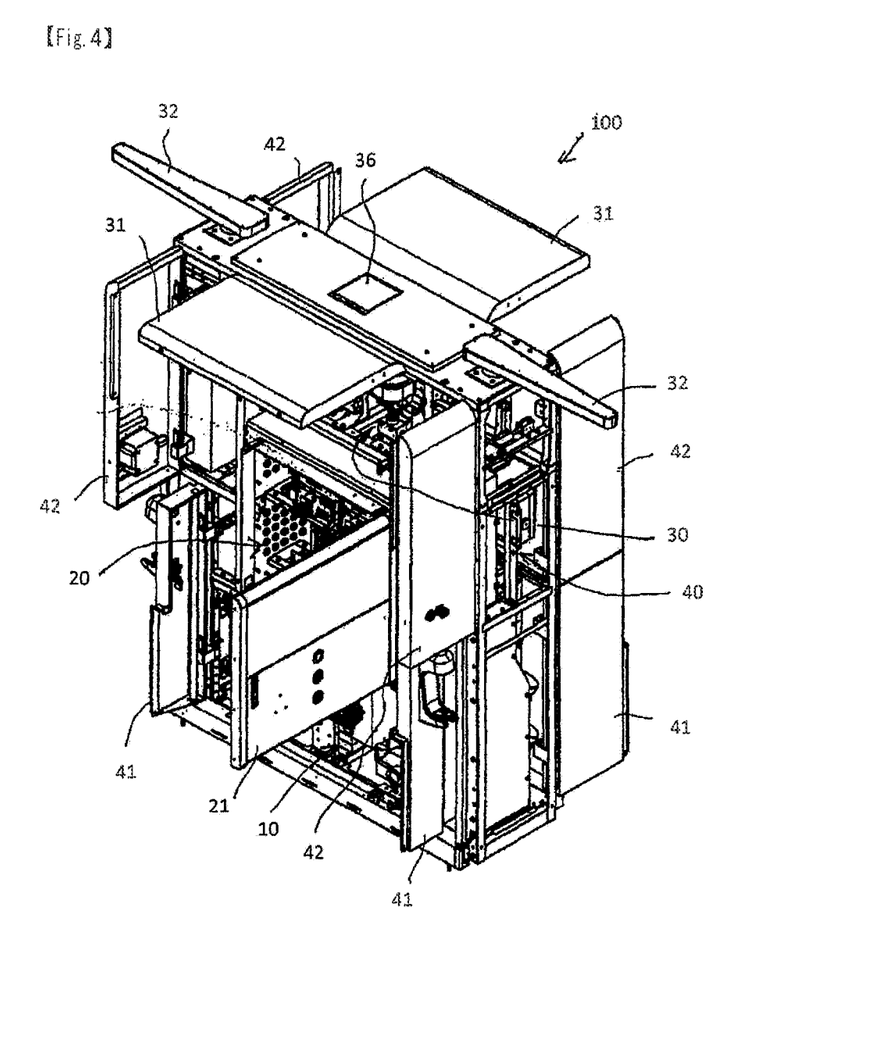
FIG. 4 is a perspective view showing a state in which various panels are opened in the illustrated embodiment.
Figure 10:
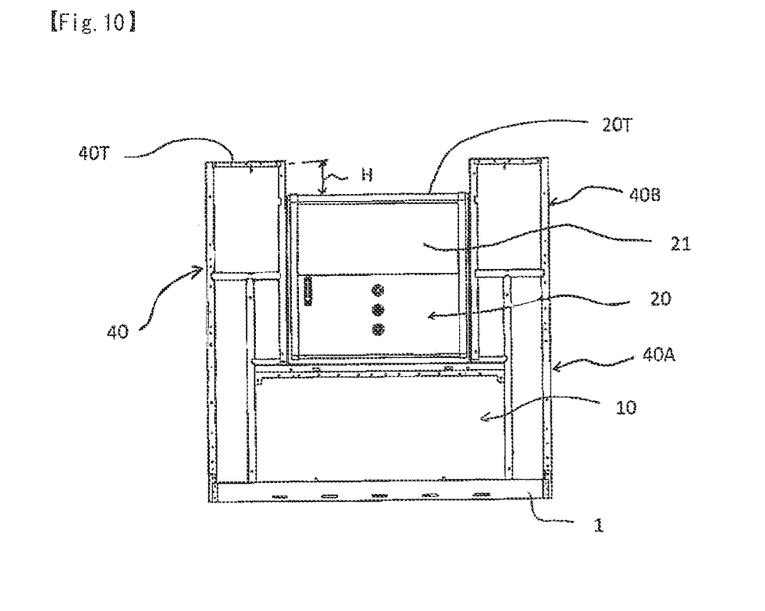
FIG. 10 is a process diagram showing a process subsequent to the process shown in FIG. 9.

As shown in FIG. 4, various panels are provided in each unit of the gas filling device 100. That is, the intermediate unit 20, the top unit 30, the lower part of the side unit 40, the upper part of the side unit 40 and the lower unit 10 are provided with a display panel (front panel) 21, a front upper panel 31, a front side lower panel 41, a front side upper panel 42 and a front lower panel, respectively. In order to avoid complication of the drawings, illustration of the front lower panel is omitted. In this specification and the accompanying drawings, for example, as shown in FIG. 10, a lower portion of the side unit 40 where the front side lower panel 41 is provided may be referred to as a side unit lower portion 40A, and an upper portion of the side unit 40 where the front side upper panel 42 is provided may be referred to as a side unit upper portion 40B. In FIG. 4, the display panel 21, the front side lower panel 41, and the front side upper panel 42 are shown opening laterally, and the front upper panel 31 is shown opening upward. In FIG. 4, a reference numeral 32 indicates a support arm for supporting the operation of the filling nozzle and the filling hose, and a reference numeral 36 indicates an explosion door as a safety device. In the illustrated embodiment, the front side is the one with a counter 14A (display section, filling amount indicator, see FIG. 12). For example, if the gas filling device is capable of filling a vehicle from both sides, the counter 14A will be on both sides, and the both sides will be on the front.

Although not clearly illustrated, in the illustrated embodiment, there are no welding points between the units in the gas filling device 100. Panels that were previously fixed by welding are now attached with adhesive. Here, if the panel is fixed to the unit by welding, the welding marks will be noticeable even after the panel is attached, and it will look bad. Then, when grinding with a sander to remove welding marks, the plating film is also removed, resulting in a decrease in corrosion resistance. In the illustrated embodiment, there are no welds, and since the panel is glued to the unit, there are no weld marks, and the appearance is good. In addition to this design effect, the work of grinding away welding marks with a sander becomes unnecessary, and corrosion resistance does not deteriorate. In addition, since there are no welding points, there are no irregularities, and the sides on which the corresponding panels of each unit (the display panel 21, the front upper panel 31, the front side lower panel 41, the front side upper panel 42) are installed are flush with each other, which improves the appearance of the panel.

In FIGS. 1 and 2, a large number of positioning holes LH are bored in the frame of each unit. The positioning holes LH can be formed at the joint location (overlapping location) between the units or corresponding to the joint location with the equipment in each unit. In FIG. 1, in order to avoid complexity, only some of the positioning holes LH are shown by lead lines. Machining the positioning holes LH allows equipment installation locations and joint locations between units to be determined with case when installing various filling equipment in each unit or when assembling units with various equipment installed. A specific example of how to connect the units to each other and to devices in each unit using the positioning hole LH in the frame of each unit will be described later with reference to FIG. 5.

Figure 5:
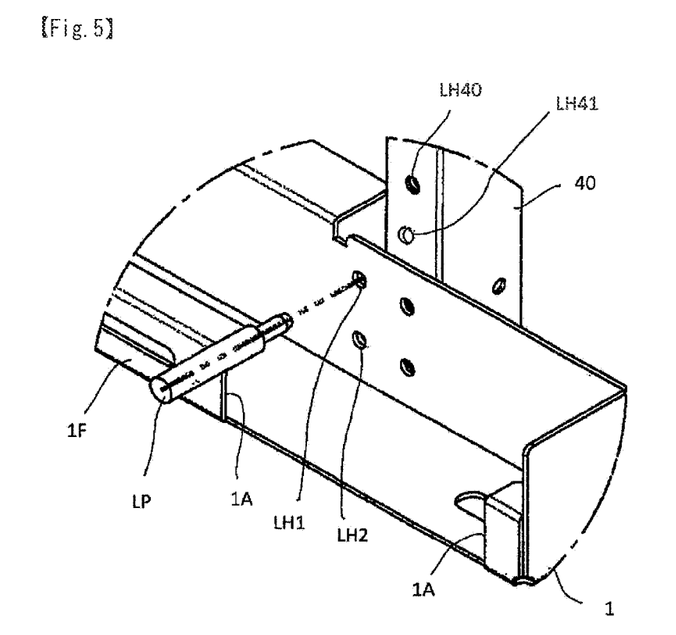
FIG. 5 is an enlarged explanatory perspective view showing a mode of coupling a base frame and a side unit.

FIG. 5 shows a mode in which the base frame 1 disposed below the lower unit 10 (FIGS. 1 to 3) and the vicinity of the lower end of the side unit 40 are coupled. A positioning hole LH1 is formed in the base frame 1 on the side unit 40 side (upper right side in FIG. 5), and a positioning hole LH40 is formed in the side unit 40 at a position corresponding to the positioning hole LH1. Although shown off-centered in FIG. 5, the positioning holes LH1 and LH40 are formed at positions that align (overlapping positions) when the base frame 1 and the side unit 40 are combined. A single locate pin LP can be inserted into the positioning holes LH1 and LH40. The positioning holes LH1 and LH40 are used for inserting and temporarily fixing the locate pin LP. After temporary fixing with the locate pin LP, a fastening hole LH2 and a fastening hole LH41 on the side unit 40 side are used as holes for inserting a fastening bolt to perform fastening. In other words, the base frame 1 and the side unit 40 each include positioning holes LH1 and LH40 into which the locate pin LP is inserted for positioning (temporary fastening), and the fastening holes LH2 and LH41 into which the fastening bolt is inserted and fastened after positioning are formed respectively.

In FIG. 5, a notch 1A is formed near the right end of the base frame 1, and a notch 1A is formed in the front surface 1F of the base frame 1. Although not clearly shown in FIG. 5, the notches 1A are formed near both left and right ends of the base frame 1. When joining (assembling) the base frame 1 and the side unit 40, the locate pin LP is inserted into the positioning hole LH1 on the base frame 1 side via the notch 1A, and then the locate pin LP penetrates the positioning hole LH40 on the frame side of the side unit 40 to temporarily fix the base frame 1 and the side unit 40. In this state, a bolt (not shown) is inserted for fastening the units together into the fastening hole LH2 on the base frame 1 side and the fastening hole LH41 on the side unit 40 side, and a nut (not shown) is used to tighten the base frame 1 and the frame of the side unit 40. After that, the locate pin LP inserted into the positioning holes LH1 and LH40 is pulled out. When connecting units (during assembly), if they are connected using bolts and nuts from the beginning, assembly errors will accumulate, and in the later stages of the assembly process, the accumulated errors (misalignment) will become larger, and bolts and nuts cannot be connected. On the other hand, as in the illustrated embodiment, before the units are joined together (for example, the base frame 1 and the side unit 40 are joined with bolts), the locate pin LP is used to temporarily fix the base frame 1 and the side unit 40, which does not cause the cumulative error to become large even in the later stages of the assembly work, and the bolts and nuts can be fastened easily and smoothly. In addition, distortion of the frame structure can be reduced.

Although FIG. 5 shows an example of the connection between the base frame 1 and the side unit 40, that is, the connection between the units, the same method as described above can be applied to the connection between the unit and the equipment to be installed in the unit. For example, as described above, when connecting and fixing a heavy gas pipe cooling section (including the heat exchanger 13, piping, etc., see FIG. 3) to the lower unit 10, first temporarily fixing it with a locate pin or temporarily assembling the equipment and then tightening it with bolts and nuts allows the equipment to easily and accurately installed without increasing errors during equipment installation. Consequently, even non-experts can connect the primary and secondary piping accurately without damaging the metal seals between the gas pipe cooling section. As a result, leakage of hydrogen gas due to damage to the metal seals can be prevented. Although not shown, inserting a binding band into the positioning hole after assembly enables wiring to be arranged in a bundle, for example.

Figure 6:
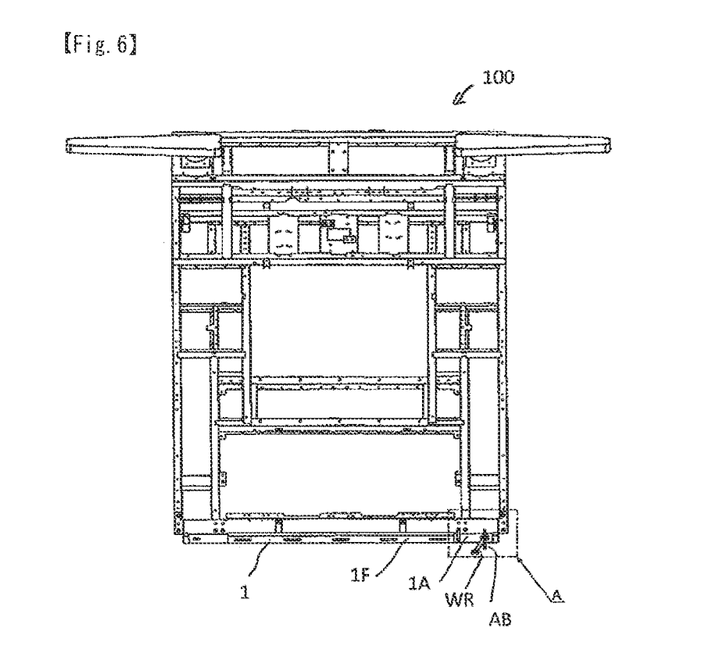
FIG. 6 is a front view of the gas filling device according to the present invention.

Next, the method for assembling a gas filling device according to the illustrated embodiment will be explained with reference to FIGS. 6 to 11. First, the installation work of the base frame 1 will be explained with reference to FIGS. 6 and 7. In FIG. 6, a notch 1A is formed in the base frame 1 at the lowest part (foundation part) of the gas filling device 100. The notch 1A in FIG. 6 is the same as the notch 1A explained in FIG. 5. In FIG. 6, the position of the notch 1A in the gas filling device 100 is clearly shown. When installing the gas filling device 100 at a predetermined position (installation position) in a hydrogen station, the base frame 1 is fixed (installed) at the installation position within the station with anchor bolts AB. At that time, it is necessary to tighten the anchor bolts AB with a wrench WR, but the workability of tightening the anchor bolts AB has conventionally been poor. In the conventional base frame 1, the front part 1F extending vertically on the front side was composed of a flat member (in the conventional gas filling device, the notch 1A was not formed in the front part 1F). Therefore, the bolt head of the anchor bolt AB may be difficult to see from an operator due to the front part 1A, and it is difficult to tighten the bolt head of the anchor bolt AB beyond the front part 1F with the wrench WR.

Figure 7:
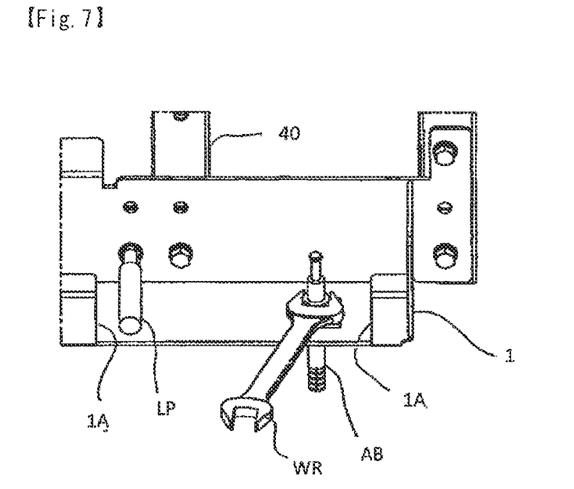
FIG. 7 is an explanatory view showing an enlarged view of a section A in FIG. 6.
Figure 8:
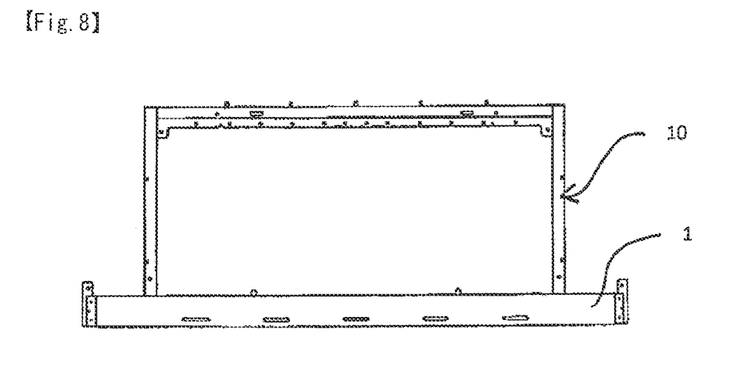
FIG. 8 is a process diagram showing one step of the assembly method according to the illustrated embodiment.
Figure 9:
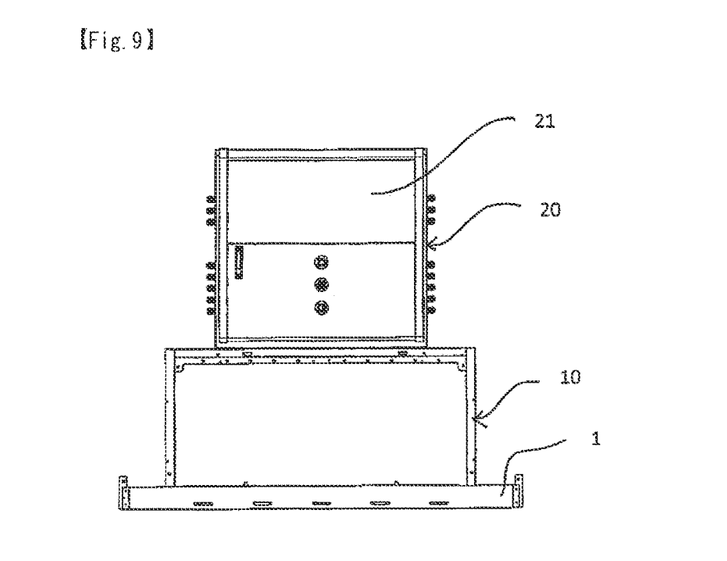
FIG. 9 is a process diagram showing a process subsequent to the process shown in FIG. 8.

On the other hand, in the gas filling device 100 to which the illustrated embodiment is applied, as described above, the notch 1A is formed in the front part 1F of the front side of the base frame 1 (viewer side in FIG. 6) to solve the problem. In FIG. 7, which is an enlarged explanatory view of the area A in FIG. 6, when tightening the anchor bolts AB and fixing (installing) the base frame 1 in a predetermined position within the station, a worker may bring his/her hand, the wrench WR, or other tool close to the bolt head of the anchor bolt AB through the notch 1A to engage the wrench WR or the like with the bolt head of the anchor bolt AB. Therefore, the anchor bolt AB can be easily and reliably tightened using a tool (for example, a wrench), and the workability of tightening the anchor bolt AB is significantly improved. In addition to the above-mentioned tightening work of the anchor bolt AB, FIG. 7 also shows an aspect of the work of temporarily fastening the base frame 1 and the side unit 40 using the locate pin LP mainly explained with reference to FIG. 5. Although not clearly illustrated, in FIGS. 6 and 7, the notches 1A are formed near both ends of the base frame 1 in a horizontal direction in FIG. 6.

Here, as described above, the equipment necessary for filling has already been installed in the lower unit 10, the intermediate unit 20, the top unit 30, and the side units 40. In the process shown in FIG. 8, the lower unit 10 is attached to the base frame 1 in the manner described with reference to FIG. 1. Then, in the step shown in FIG. 9, the intermediate unit 20 with the display panel 21 attached to the front surface is assembled so as to be stacked above the lower unit 10.

Next, in the step shown in FIG. 10, the side units 40 are attached to both sides of the lower unit 10 and the intermediate unit 20 (both left and right sides in FIG. 10). As described with reference to FIG. 4, the lower part of the side unit 40 is indicated by the reference numeral 40A, and the upper part of the side unit 40 is indicated by the reference numeral 40B. In addition as shown in FIG. 10, a top 40T of the side unit 40 is at a higher position by the dimension indicated by the symbol H than a top 20T of the intermediate unit 20 stacked on the lower unit 10.

Figure 11:
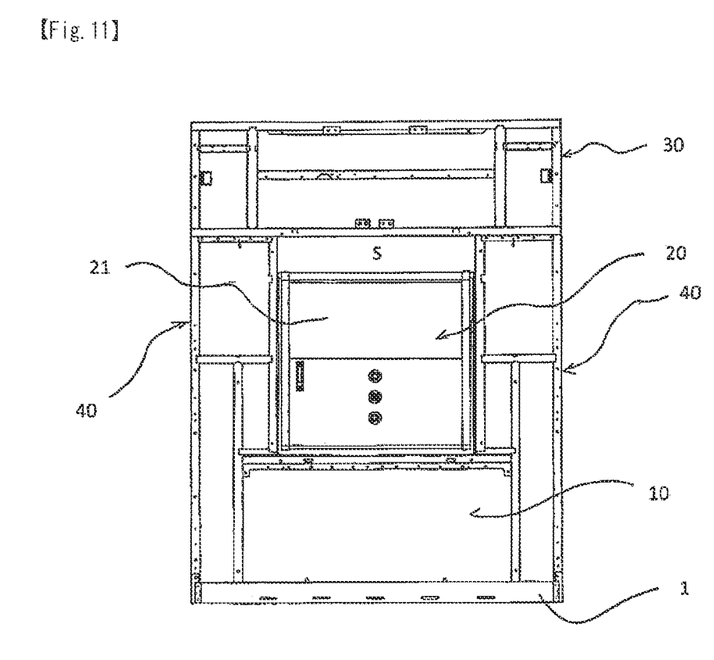
FIG. 11 is a process diagram showing a process subsequent to the process shown in FIG. 10.

Then, in the step shown in FIG. 11, the top unit 30 is arranged in a region above the intermediate unit 20 across a space S to connect to the side unit 40. The space S between the intermediate unit 20 and the top unit 30 corresponds to the dimension H shown in FIG. 10 (the difference in vertical dimension between the top 40T of the side unit 40 and the top 20T of the intermediate unit 20). The assembly of the gas filling device 100 is completed in the state shown in FIG. 11, but finishing work and other operations (not shown) are performed.

Adopting the assembly method shown in FIGS. 6 to 11 enables various equipment necessary for gas filling to be installed in advance in any of the lower unit 10, the intermediate unit 20, the side unit 40, and the top unit 30, which reduces total assembly man-hours. Further, this is easier than the work of fixing the equipment within the frame of the gas filling device 100 which is constructed by assembling units together, and the labor required for the work is extremely reduced. Furthermore, since each unit is formed with the positioning holes LH, assembly errors and distortion of the frame structure can be reduced.

Figure 12:
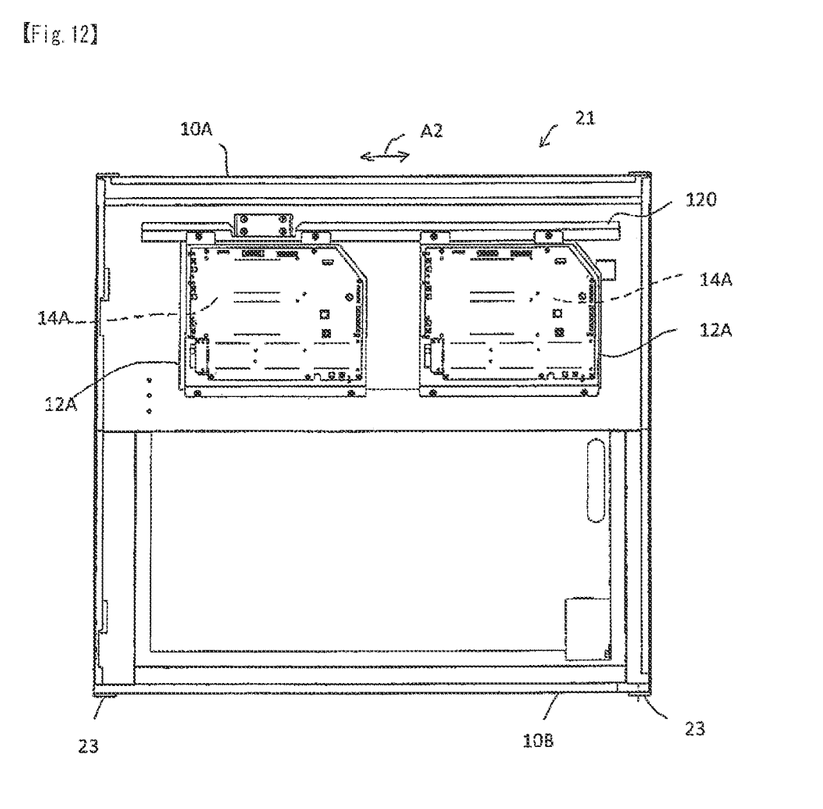
FIG. 12 is a rear view of a display panel attached to the front surface of the intermediate unit.

In FIG. 12, the back side of the display panel 21 attached to the front side of the intermediate unit 20 is shown. In FIG. 12, electronic device mounting portions 12A are provided at two locations on the left and right at the upper portion of the display panel 10, and a filling amount indicators 14A (counters) and necessary electronic devices are arranged in the electronic device mounting portion 12A. In FIG. 12, a rain gutter 120 is provided above the electronic device mounting portions 12A and near the upper edge of the display panel 21. The rain gutter 120 extends in a horizontal direction (width direction, the arrow A2 direction), and its length is longer that the widths of the filling amount indicators 14A (in FIG. 12, the sum of the widths of the two electronic device mounting portions 12A on the left and right).

Since the rain gutter 120 is provided to extend in the width direction above the electronic device mounting portion 12A, water splashed on the back surface of the display panel 21 when the display panel 21 is opened is prevented from contacting with electronic equipment such as the filling amount indicator 14A located in the electronic device mounting portion 12A. Although not clearly shown, a sealing mechanism (not shown) is provided in a portion of the intermediate unit 20 that faces the upper edge 10A of the display panel 21 shown in FIG. 12. The sealing mechanism is in contact with the upper edge 10A of the display panel 21 at a position that covers at least the upper part of the rain gutter 120 when the display panel 21 is closed. When the display panel 21 is closed by the sealing mechanism, the upper edge 10A of the display panel 21 comes into contact with the sealing mechanism, and water does not enter from the contact area. Therefore, when the display panel 21 is closed, rainwater or the like is prevented from entering the electronic device mounting portion 12A side of the display panel 21.

However, when the display panel 21 is opened (for example, at the moment it is opened), rainwater that has accumulated on the top surface of the sealing mechanism (not shown) provided in the intermediate unit 20 splashes and spills onto the back surface of the display panel 21. Even in such a case, as shown in FIG. 12, since the rain gutter 120 is arranged above the electronic device mounting parts 12A, all the rainwater splashing on the display panel 21 will flow into the rain gutter 120 and does not reach the electronic equipment (filling level display 14A, etc.) disposed in the lower electronic equipment mounting part 12A. In addition, the water that has entered the rain gutter 120 flows in a longitudinal direction of the rain gutter 120 (the arrow A2 direction in FIG. 12) and falls from both ends (both left and right ends in FIG. 2), which prevents the electronic equipment (filling amount indicator 14A, etc.) from coming into contact with water droplets. Therefore, it is possible to eliminate the causes of failures and malfunctions caused by rainwater coming into contact with electronic devices. Through holes 23 are formed in the lower surface 10B (lower end) of the display panel 21 at locations corresponding to the position where water falls from the rain gutter 120, which causes water falling from both ends of the rain gutter 120 to be discharged to outside of the filling device 100 through the through holes 23, and prevents water from remaining inside the filling device 100.

The rain gutter 120 is attached to the display panel 21, and the rain gutter 120 and the display panel 21 are fixed in a watertight manner, for example, with adhesive. Here, spot welding is not used to attach the rain gutter 120 to the display panel 21. This is because if the rain gutter 120 is spot welded to the sheet metal of the display panel 21, there is a risk that water will leak from the area between the spots and the water droplets will come into contact with the electronic device. On the other hand, if the rain gutter 120 is fixed with adhesive, the side surfaces of the rain gutter 120 will come into contact with the back surface of the display panel 21 over the entire area, so that the rain gutter 120 and the display panel 21 will be fixed in a watertight manner, and water does not move downward from between the panels 21, and water droplets are prevented from coming into contact with electronic equipment. Here, as the adhesive used to adhere the rain gutter 120 to the display panel 21, a structural adhesive for adhering metals (for example, the product name "Metal Grip" sold by 3M Japan Limited) can be used.

Although not clearly shown in the drawings, the main body of the switch section of the pressure relief valve 14 (inlet side pressure relief valve: see FIG. 3) of the gas filling device 100 to which the illustrated embodiment is applied has a bracket with an L-shaped elastic sheet metal. The bracket is attached to the top of the pressure relief valve body and the main body of the switch, and by elastically bending, even if a movable part of the switch rises excessively, it absorbs the displacement and prevents malfunction of the switch base. This suppresses or prevents loosening of the screws used to attach the sensing part. In addition, a spacer (not shown) having a thickness of, for example, 5 mm is attached to the switch section of the pressure relief valve 14 via a flexible member and a mounting bracket to facilitate adjustment of the stroke of the movable section of the switch section. This eliminates the need for workers to carry around spacers during various maintenance inspections.

It should be noted that the illustrated embodiments are merely examples and are not intended to limit the technical scope of the present invention.

DESCRIPTION OF THE REFERENCE NUMERALS 1 base frame
1A notch
10 lower unit
13 heat exchanger
20 intermediate unit
30 top unit 33 flow meter
40 side unit
100 gas filling device
LH positioning hole
LP pin (locate pin)

The invention claimed is:

1. A method for assembling a gas filling device comprising the steps of:
installing a base frame;
placing a lower unit containing a heat exchanger on the installed base frame;
positioning an intermediate unit including a display above said lower unit;
arranging side units on both sides of said lower unit and the intermediate unit, said side units housing filling hoses having filling nozzles at their tips;
arranging a top unit containing a flow meter above the intermediate unit; and
facilitating attachment between at least one adjacent pair of the base frame, the lower unit, the intermediate unit, and the side units by forming corresponding positioning holes in the at least one adjacent pair and temporarily inserting a locate pin within the corresponding positioning holes in the at least one adjacent pair, the locate pin being non-threaded to facilitate temporary insertion within the corresponding positioning holes in the at least one adjacent pair.

2. The method for assembling a gas filling device as claimed in claim 1, wherein said lower unit, said intermediate unit, said side units and said top unit have equipment necessary for gas filling installed inside them.

3. The method for assembling a gas filling device as claimed in claim 1, wherein a notch is formed in the base frame.

4. The method for assembling a gas filling device as claimed in claim 1, further comprising the step of joining the at least one adjacent pair using a mechanical fastener while the locate pin is temporarily inserted within the corresponding positioning holes in the at least one adjacent pair.

5. The method for assembling a gas filling device as claimed in claim 4, wherein the mechanical fastener is a bolt.

6. The method for assembling a gas filling device as claimed in claim 4, further comprising the step of removing the locate pin from the corresponding positioning holes in the at least one adjacent pair after the at least one adjacent pair are joined using the mechanical fastener.

* * * * *